US006262537B1

(12) United States Patent
Matsumoto

(10) Patent No.: US 6,262,537 B1
(45) Date of Patent: Jul. 17, 2001

(54) HEADLIGHT CIRCUIT FOR AN AUTOMOBILE

(75) Inventor: Shinichi Matsumoto, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/532,736

(22) Filed: Mar. 22, 2000

(30) Foreign Application Priority Data

Mar. 23, 1999 (JP) .................................................. 11-077822

(51) Int. Cl.[7] ...................................................... B60Q 1/02
(52) U.S. Cl. ............................ 315/82; 315/77; 307/10.8; 362/802
(58) Field of Search ............................... 315/82, 77, 83; 307/10.8, 10.1; 362/61, 802

(56) References Cited

U.S. PATENT DOCUMENTS

| Re. 34,886 | * | 3/1995 | Irie ............................................ 315/83 |
| 5,030,884 | * | 7/1991 | Roussey et al. ........................... 315/83 |
| 5,081,565 | * | 1/1992 | Nabha et al. .............................. 362/61 |
| 5,780,974 | * | 7/1998 | Pabla et al. ............................... 315/82 |
| 5,955,842 | * | 9/1999 | Dykes ....................................... 315/82 |

FOREIGN PATENT DOCUMENTS 9290684    11/1997 (JP) .
10-86746    4/1998 (JP) .

OTHER PUBLICATIONS

An English Language abstract of JP 10–86746.
An English Language abstract of JP 9–290684.

* cited by examiner

Primary Examiner—Don Wong
Assistant Examiner—Tuyet T. Vo
(74) Attorney, Agent, or Firm—Greenblum & Bernstein, P.L.C.

(57) ABSTRACT

A lamp circuit for lighting a head lamp and a high beam lamp of an automobile is provided. A first lamp circuit includes a common circuit, an ordinary lighting circuit, and a daylight running lighting circuit. A second lamp circuit is connected to the first lamp circuit. A portion of the common circuit is connected to positive and negative sides of the head lamp and the high beam lamp on one side of the automobile. When the automobile is configured for ordinary lighting conditions, a remaining portion of the common circuit is connected to circuit elements for ordinary lighting and the second lamp circuit, the ordinary lighting circuit connects the common circuit, as connected to the positive side of the high beam lamp, with the circuit elements for ordinary lighting, and the daylight running lighting circuit does not form any circuit. When the automobile is configured for daylight running lighting, the remainder of the common circuit and the daylight running lighting circuit is connected to circuit elements for daylight running lighting and the second lamp circuit, and the ordinary lighting circuit does not form any circuit.

5 Claims, 4 Drawing Sheets

HEADLIGHT CIRCUIT FOR AN AUTOMOBILE

CROSS-REFERENCE TO RELATED APPLICATIONS

The present application claims priority under 35 U.S.C. § 119 of Japanese Patent Application No. 11-077822, filed on Mar. 23, 1999, the disclosure of which is expressly incorporated by reference herein in its entirety.

BACKGROUND OF THE INVENTION

1. Field of the Invention

The present invention relates to a headlight circuit for an automobile. More particularly, the present invention relates to a circuit that can be used in cars configured for different operating environments.

2. Background and Material Information

Cars for the Japanese domestic market have "ordinary lighting" type headlight circuits (hereinafter "lamp circuits") which light the headlight bulb or high beam bulb when a driver turns a light switch ON. On the other hand, in view of poor ambient lighting, the headlights for cars in Northern Europe must be on during the daytime. These cars use a DRL (Daytime Running Light) circuit that operates the high beam headlight at a reduced power level if (1) the ignition switch is ON, (2) the hand brake is released, and (3) the head lamp switch is OFF. The DRL lamp circuit turns the high beam light off and turns the regular head light(s) on when the light switch is switched ON.

FIG. 3 shows a prior art ordinary lighting lamp circuit 1 for a conventional automobile configured for use in the Japanese market. The lamp circuit 1 includes a left side lamp circuit 1-L and a right side lamp circuit 1-R. In the left side lamp circuit 1-L, wires d1–d9 connect a lamp switch 2 (for ordinary lighting), an ECU (i.e., an electronic control unit) 3, a relay box 4, a junction box 5, a battery 6, a head lamp 7L, and a high beam lamp 8L. Wires d1–d9 are configured in a wire harness for the left side lamp for exclusive use for lighting as a group of wires by bundling the wires d1–d9.

FIG. 4 shows a conventional lamp circuit 1' for DRL. Lamp circuit 1' includes a left side lamp circuit 1-L' and a right side lamp circuit 1-R', similar to ordinary lighting circuit 1. In the left side lamp circuit 1-L', wires d1'–d12' connect a lamp switch 2' (for DRL lighting), an ECU 3', a relay box 4', a junction box 5', battery 6, head lamp 7L, and the high beam lamp 8L. Also, in the right side lamp circuit 1-R', there is a relay box 9' specific to the lighting conditions of DRL. The above electric wires d1'–d12' are configured in a wire harness for the left side lamp for exclusive use for DRL lighting as a group of wires by bundling the wires d1'–d12'.

In the above lamp circuits 1 and 1', various circuit elements are provided exclusively for the different circuits, such that the connections between the each apparatus differ. As a result, the setup of the electric wires to form the appropriate circuit are also different. This in turn requires different wire harnesses and/or assembly procedures for the different connections. This leads to an increase in labor and in manufacturing costs for different kinds of the wire harnesses.

SUMMARY OF THE INVENTION

The present invention provides a lamp circuit lighting a head lamp and a high beam lamp in an automobile. A first lamp circuit includes a common circuit, an ordinary lighting circuit, and a DRL lighting circuit. Part of the common circuit is connected to positive and negative sides, respectively, of the head lamp and the high beam on one side of the vehicle.

When the lamp circuit is used for ordinary lighting, the remainder of the common circuit is connected to the control apparatus for ordinary lighting and a second lamp circuit. The ordinary lighting circuit connects the common circuit to the positive side of the high beam lamp with the control apparatus for the ordinary lighting. The DRL lighting circuit is not connected in this configuration.

When the lamp circuit is used for DRL lighting, the remainder of the common circuit and the DRL lighting circuit connect to the control apparatus for DRL lighting and the second lamp circuit. The ordinary lighting circuit is not connected in this configuration.

The common circuit, ordinary lighting circuit, and DRL lighting circuit of the first lamp circuit can thus be commonly used for vehicles that are configured for ordinary lighting or DRL lighting.

As described above, since the first lamp circuit is a part of the lamp circuit by a common circuit, an ordinary lighting circuit and a DRL lighting circuit, a single type of wire harness can be used to connect these circuits. Further, while the above configuration will result in an increased wiring cost (as wires are present for both DRL and ordinary lighting, albeit, only one set is actively used), the use of a single wiring harness decreases the overall cost of the device.

The control elements to be used in the above lamp circuit include an ECU, a relay and a relay box having a fuse connected to the lamp switch, and a junction box connected to the battery. For ordinary lighting, the control elements for exclusive ordinary lighting are used, and for the DRL lighting, the control elements for exclusive DRL lighting are used. Therefore, though the connection methods are different, by using the first lamp circuit including the above common circuit, an ordinary lighting circuit and a DRL lighting circuit, such that a lamp circuit that meets the respective requirements can be formed.

The first and second lamp circuits connect through the terminal at the ends of the respective circuits. The positions of the connection terminals of the first lamp circuits are common for both the ordinary lighting and DRL lighting. The positions of the connection terminals of the second lamp circuit differ between the ordinary lighting and DRL lighting based on the intended use.

As described above, by connecting the first lamp circuit and the second lamp circuit through connectors of the respective circuit terminals, the entire lamp circuit can be easily connected. Also, as the first lamp circuit is commonly used for ordinary lighting as well as for DRL lighting, the connector terminals can be universal. Similarly, as the second lamp circuit is designed for exclusive use for a specific application, the connector terminals may be made exclusive.

According to an embodiment of the present invention, there is provided a lamp circuit for lighting a head lamp and a high beam lamp of an automobile. A first lamp circuit includes a common circuit, an ordinary lighting circuit, and a daylight running lighting circuit. A second lamp circuit is connected to the first lamp circuit. A portion of the common circuit is connected to positive and negative sides of the head lamp and the high beam lamp on one side of the automobile;. When the automobile is configured for ordinary lighting conditions, a remaining portion of the common circuit is connected to circuit elements for ordinary lighting and the second lamp circuit, the ordinary lighting circuit connects the common circuit, as connected to the positive side of the high beam lamp, with the circuit elements for ordinary lighting, and the daylight running lighting circuit does not form any circuit. When the automobile is configured for daylight running lighting, the remainder of the common circuit and the daylight running lighting circuit is connected to circuit elements for daylight running lighting and the second lamp circuit, and the ordinary lighting circuit does not form any circuit.

According to a feature of the above embodiment, the first lamp circuit and the second lamp circuit connect by connecting first and second connectors through terminals at the ends of the respective circuits, connection terminals in the first connector of the first lamp circuit being common for both ordinary lighting and daylight ruing lighting, and the positions for inserting terminals in the connector of the second lamp circuit are different for ordinary lighting use and daylight running lighting.

According to another embodiment of the present invention, a lighting circuit for a vehicle is provided. It includes, a plurality of common wires, a plurality of daylight running wires, at least one ordinary lighting wire, and a plurality of common circuit elements, including at least a normal headlight and a high beam headlight. Only one of the plurality of daylight running wires and the at least one ordinary lighting wire is connected to form a circuit with the plurality of common wires and the plurality of common circuit elements. The other of the plurality of daylight running wires and the at least one ordinary lighting wire is not connected to form a circuit with the plurality of common wires and the plurality of common circuit elements.

According to a feature of the above embodiment, a wiring harness supports the plurality of common wires, the plurality of daylight running wires, and the at least one ordinary lighting wire.

In accordance with yet another embodiment of the present invention, there is provided a vehicle with a lighting system. The vehicle includes a vehicular body, first, second, third, and fourth lights mounted in the vehicular body, and a common circuit. The common circuit includes a ground connected to a first terminal of the first light, a second terminal of the first light connected to a first terminal of a first fuse, a second terminal of the first fuse connected to a first terminal of a relay, a second terminal of the relay connected to a first terminal of a junction box, a third terminal of the relay connected to an electronic control unit, a first connector connected to a second fuse, the first connector connected to first and second terminals of the second light, and a third fuse. An ordinary lighting circuit is capable of connecting the first connector and the first terminal of the first fuse. A daylight running circuit is capable of connecting the first connector to the junction box, and the first connector to the first terminal of the relay through the third fuse. Only one of the ordinary lighting circuit and the daylight running circuit is connected to form a circuit with the common circuit. The other of the ordinary lighting circuit and the daylight running circuit is not connected to form a circuit with the common circuit.

According to a feature of the above embodiment, the ordinary lighting circuit and the daylight running circuit include a plurality of wires. A wiring harness is configured with the plurality of wires.

According to another feature of the above embodiment, a second circuit includes at least a second connector connected to the first connector. The third and fourth lights and the second circuit are configured for one of ordinary lighting and daylight running lighting. The only one of the ordinary lighting circuit and the daylight running circuit are based on the corresponding configuration of the second circuit.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
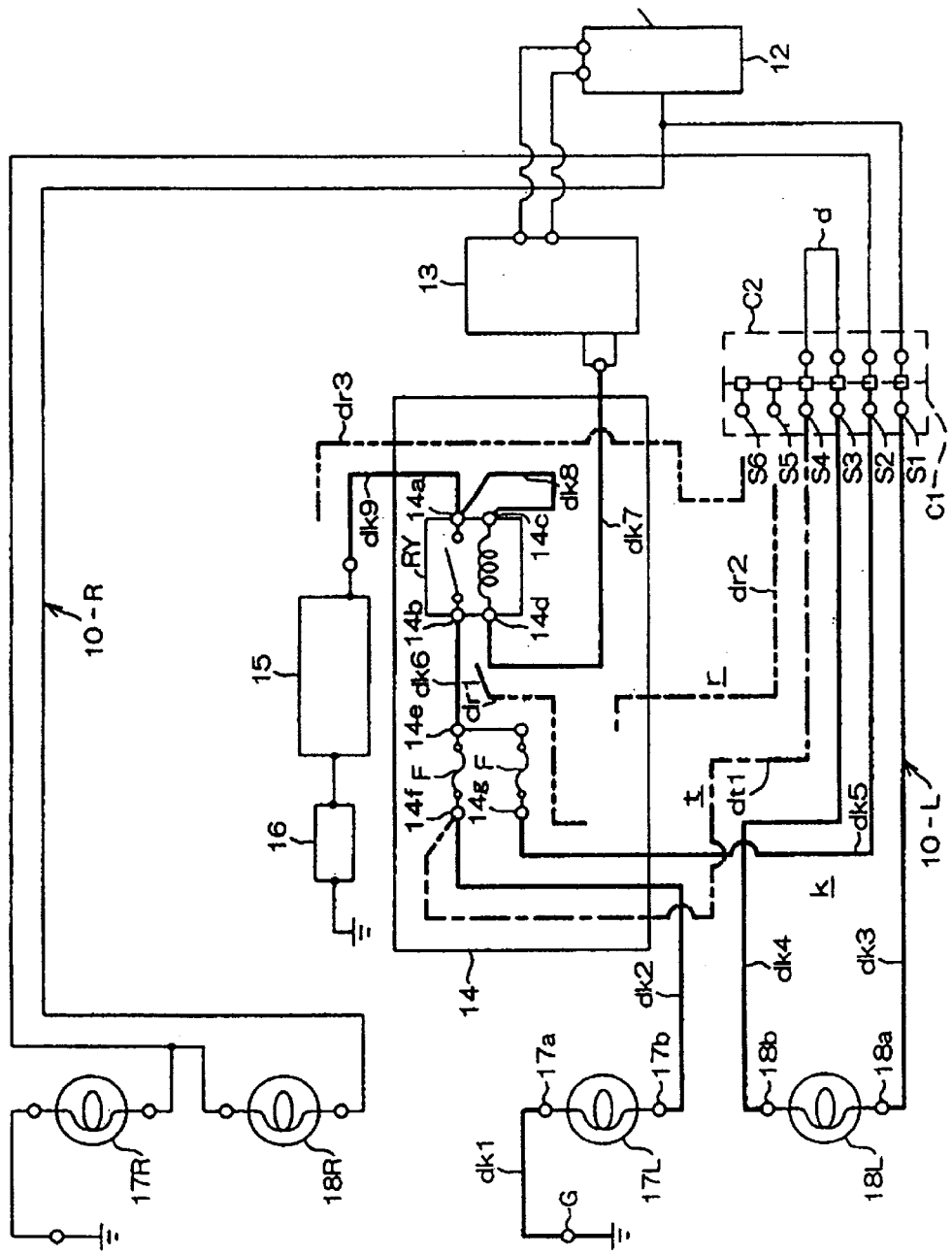
FIG. 1 is a lamp circuit diagram for ordinary lighting according to the present invention.

A lamp circuit 10 for ordinary lighting shown in FIG. 1 is designed for lighting head lamps 17L, 17R and high beam lamps 18L, 18R. A left side lamp circuit 10-L defines a first lamp circuit and a right side lamp circuit 10-R define a second lamp circuit.

Lamp circuit 10 has an ECU 13 connected with a lamp switch 12 for ordinary lighting, a relay box 14, and a junction box 15. Relay box 14 is internally provided with a relay RY and a fuse F, and further with positive and negative side relay contacts 14a, 14b, positive and negative side coil contacts 14c, 14d, positive side fuse contact 14e, and first and second negative side fuse contacts 14f, 14g. Junction box 15 connects with a battery 16 for power supply.

Left side lamp circuit 10-L includes a common circuit k, an ordinary lighting circuit t, and a DRL lighting circuit r. In actual use, the above common use circuit k includes nine wires dk1–dk9 (shown in solid lines), ordinary lighting circuit t by a single wire dt1 (shown as an alternating single dot and dash line), and DRL lighting circuit r including three wires dr1–dr3 (shown in double dot and dash lines). These wires are bundled into a group of wires in the style of a wire harness for left side lamp circuit 10-L.

The wires of common circuit k are configured as follows. Wire dk1 connects a negative side 17a of head lamp 17L with the ground G. Wire dk2 connects a positive side 17b of head lamp 17L with first negative side fuse contact 14f. Wire dk3 connects a negative side 18a of high beam lamp 18L with an insertion part (terminal) s1 of a connector C1. Wire dk4 connects a positive side 18b of high beam lamp 18L with an insertion part s3 of connector C1. Wire dk5 connects fuse contact 14g on the second negative side with an insertion part s2 of connector C1. Wire dk6 connects the positive side fuse contact 14e with the negative side relay contact 14b. Wire dk7 connects the negative side coil contact 14d with the ECU 13. Wire dk8 connects the poseitive side relay contact 14a with the positive side relay contact 14 c. Wire dk9 connects the positive side relay contact 14a with junction box 15.

When configured for ordinary lighting, ewire d1 connects first negative side fuse contact 14f with an insertion part s4 of connector C1. The connection between connector C1 with insertion parts s1–s4 is made by connecting the terminal (not illustrated) to the end of the wire to be connected, and inserting the above terminal in insertion parts s1–s4 of the required terminal insertion position of connector C1. Wires dr1–dr3 of the DRL lighting circuit are not connected to any circuit elements.

The right side lamp circuit 10-R, which is exclusively for ordinary lighting, has a lamp switch 12, and a head lamp 17R and a high beam lamp 18R. To the circuit end part a connector C2 is connected. This connection to connector C2 is also made by the insertion of the terminal in the same manner as above, and the terminal is inserted in the insertion part for forming a lamp circuit for ordinary lighting.

The above left side lamp circuit 10-L and right side lamp circuit 10-R are connected by the combination of connector C1 with connector C2. By this connection, wire dk4, connected to insertion part s3, and wire dt1, connected to insertion part s4, connect through a wired of second lamp circuit 10-R to define a circuit for ordinary lighting. In the above lamp circuit 10, by operating lamp switch 12, electricity is supplied from battery 16 to light high beam lamps 18L, 18R.

Figure 2:
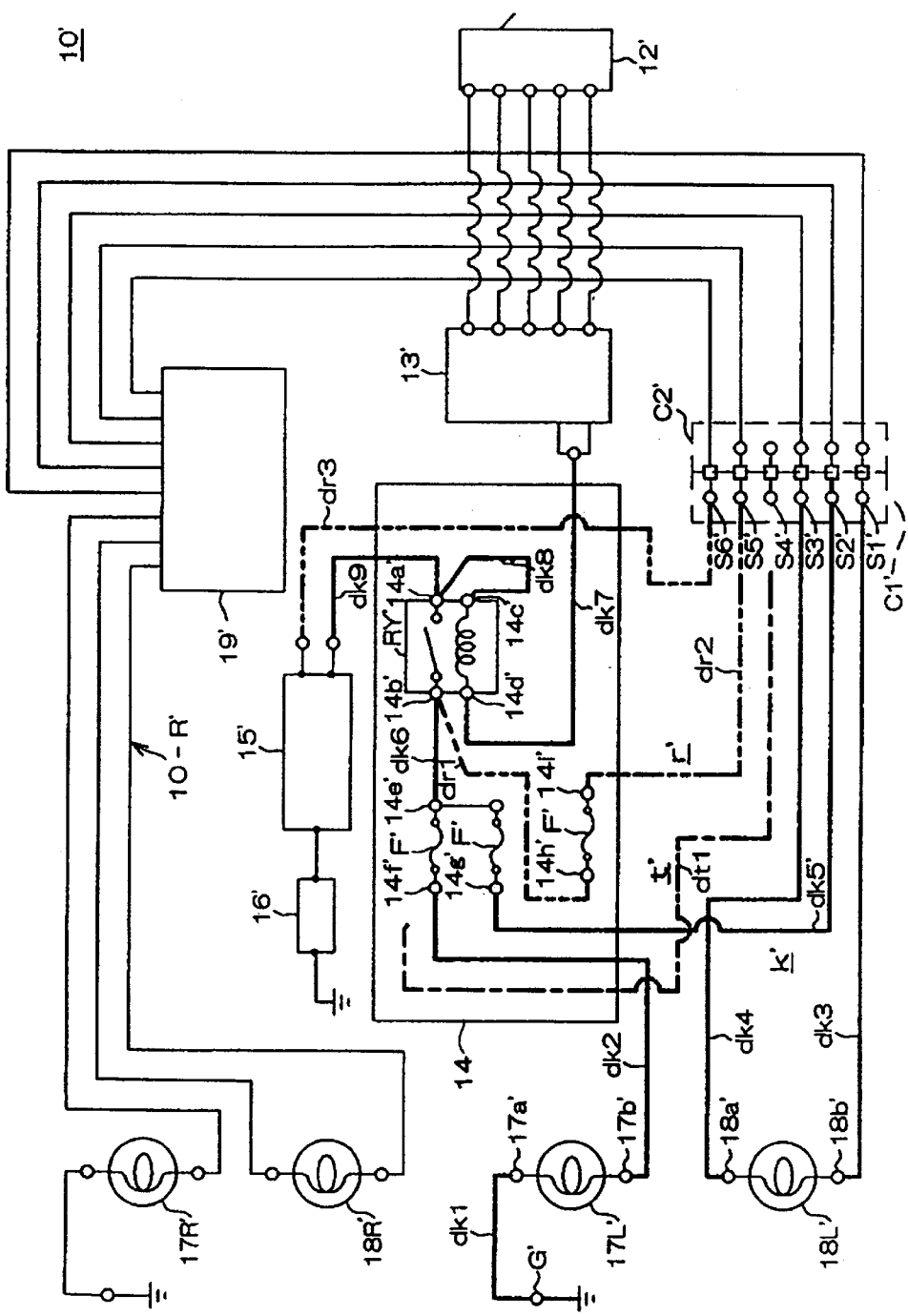
FIG. 2 is a lamp circuit diagram for DRL lighting according to the present invention.
Figure 3:
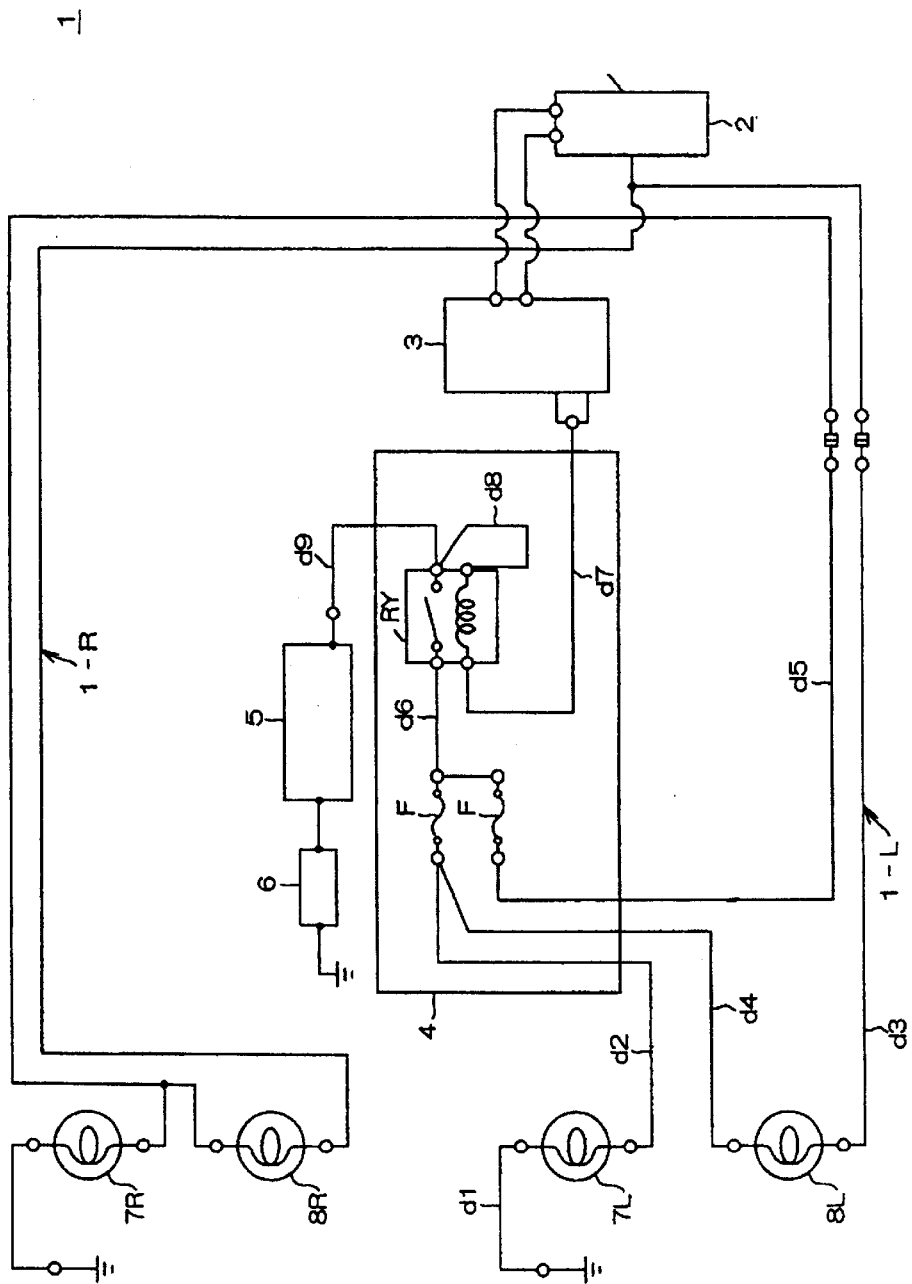
FIG. 3 is a prior art lamp circuit diagram for an ordinary lighting circuit.
Figure 4:
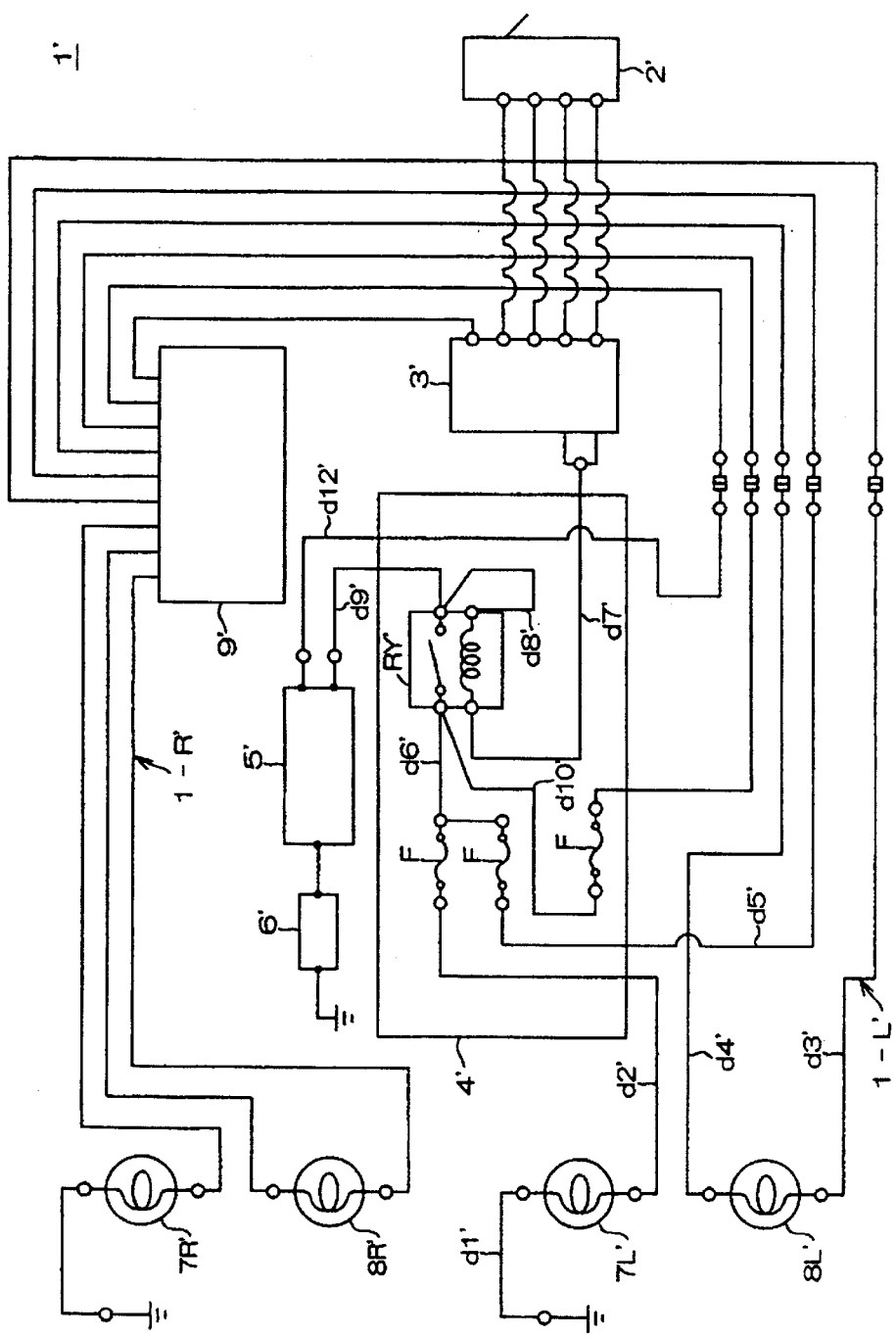
FIG. 4 is a prior art lamp circuit diagram for a DRL circuit.

A lamp circuit 10' for DRL is shown in FIG. 2, and includes a left side lamp circuit 10-L' with a right side lamp circuit 10-R', in the same manner as in ordinary lighting. Lamp circuit 10' also has the control elements similar to lamp circuit 10 for ordinary lighting. However, due to the difference of the operating conditions for lighting, various control elements are exclusively for the DRL lighting.

Left side lamp circuit 10-L' includes a common circuit k', an ordinary lighting circuit t', and a DRL lighting circuit r', in the same manner as in left side lamp circuit 10-L. Connection of the above-noted control elements is made by the wire harness wires dk1–dk9 for left side lamp to be used in common with ordinary lighting, a wire dt1, wires dr1–dr3, etc. As these control elements are for exclusive use for DRL, there are parts where the connection methods are different.

Wire dt1 for ordinary lighting circuit t is not connected to any circuit elements in this configuration. Wire dr1 connects a negative side relay contact 14b' and a third positive side fuse contact 14h', wire dr2 connects third negative side fuse contact 14i' with an insertion part s5' of a connector C1'. Wire dr3 connects a junction box 15' with an insertion part s6'. Connection of wires dk1–dk9' in common circuit k' is similar to that for ordinary lighting.

The right side lamp circuit 10-R' (shown in dash line in the drawing) to be used exclusively for DRL lighting is provided with a second relay box 19' so as to meet the DRL lighting conditions. The insertion position of the terminal (not illustrated) to circuit end connector C2' is different from that of ordinary lighting, designed for insertion to the required position so as to form a lamp circuit for DRL lighting.

Left side lamp circuit 10-L' and right side lamp circuit 10-R' are connected through connector C1' and connector C2'. By this connection, lamp circuit 10' forms the circuit for DRL lighting. In the above lamp circuit 10', when (1) the ignition switch is ON, (2) the hand brake is released, and (3) the head lamp switch is OFF, then the high beam lamp is lit under reduced power (i.e., less than normal). Turning the lamp switch 12' on will turn high beam lamps 18L' 18R' off, and head lamps 17L', 17R' are lit normally.

In the above lamp circuit 10 for ordinary lighting and lamp circuit 10' for DRL lighting, the connection between left side lamp circuit 10-L (L') and right side lamp circuit 10-R (R') are not limited to the combination with connector C1 (C1') or the like but may be made with other connection methods.

As apparent from the above description, by using the lamp circuit for an automobile, even in the event of the different specifications between the use for ordinary lighting and for DRL lighting, a part of the circuit can be commonly used, such that a single type of wire harness to support the wires used for connecting the circuit may be commonly used. As a result, the diversity of the wire harness can be curtailed, and the associated costs reduced. In addition, the connection for forming the lamp circuit can be readily constituted by connecting the right and left lamp circuits mutually with the connectors, and the respectively different specifications may be easily formed up.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A lamp circuit for lighting a head lamp and a high beam lamp of an automobile, said lamp circuit comprising:

a first lamp circuit including a common circuit, an ordinary lighting circuit, and a daylight running lighting circuit;

a second lamp circuit connected to said first lamp circuit;

a portion of said common circuit being connected to positive and negative sides of the head lamp and the high beam lamp on one side of the automobile;

wherein when the automobile is configured for ordinary lighting conditions, a remaining portion of said common circuit is connected to circuit elements for ordinary lighting and the second lamp circuit, said ordinary lighting circuit connects the common circuit, as connected to the positive side of the high beam lamp, with the circuit elements for ordinary lighting, and the daylight running lighting circuit does not form any circuit; and;

wherein when the automobile is configured for daylight running lighting, said remainder of said common circuit and said daylight running lighting circuit are connected to circuit elements for daylight running lighting and said second lamp circuit, and said ordinary lighting circuit does not form any circuit.

2. The lamp circuit according to claim 1, wherein said first lamp circuit and said second lamp circuit connect by connecting first and second connectors through terminals at the ends of the respective circuits, connection terminals in said first connector of the first lamp circuit being common for both ordinary lighting and daylight running lighting, and the positions for inserting terminals in the connector of the second lamp circuit are different for ordinary lighting use and daylight running lighting.

3. A lighting circuit for a vehicle, comprising:

a plurality of common wires;

a plurality of daylight running wires;

at least one ordinary lighting wire;

a plurality of common circuit elements, including at least a normal headlight and a high beam headlight;

only one of said plurality of daylight running wires and said at least one ordinary lighting wire being connected to form a circuit with said plurality of common wires and said plurality of common circuit elements; and the other of said plurality of daylight running wires and said at least one ordinary lighting wire not being connected to form a circuit with said plurality of common wires and said plurality of common circuit elements.

4. A vehicle with a lighting system, comprising:

a vehicular body;

first, second, third, and fourth lights mounted in said vehicular body;

a common circuit, comprising:

a ground connected to a first terminal of said first light;

a second terminal of said first light connected to a first terminal of a first fuse;

a second terminal of said first fuse connected to a first terminal of a relay;

a second terminal of said relay connected to a first terminal of a junction box;

a third terminal of said relay connected to an electronic control unit;

a first connector connected to a second fuse;

said first connector connected to first and second terminals of said second light; and a third fuse;

an ordinary lighting circuit being capable of connecting said first connector and said first terminal of said first fuse;

a daylight running circuit capable of connecting said first connector to said junction box, and said first connector to said first terminal of said relay through said third fuse;

only one of said ordinary lighting circuit and said daylight running circuit being connected to form a circuit with said common circuit; and the other of said ordinary lighting circuit and said daylight running circuit not being connected to form a circuit with said common circuit.

5. The vehicle lighting system of claim 4, further comprising:

a second circuit including at least a second connector connected to said first connector;

said third and fourth lights and said second circuit being configured for one of ordinary lighting and daylight running lighting; and said only one of said ordinary lighting circuit and said daylight running circuit being based on the corresponding configuration of said second circuit.

* * * * *